March 15, 1932. O. G. SIMMONS 1,849,810
HOB AND METHOD OF CUTTING FOR TAPERED GEARS
Filed Jan. 30, 1929   5 Sheets-Sheet 1
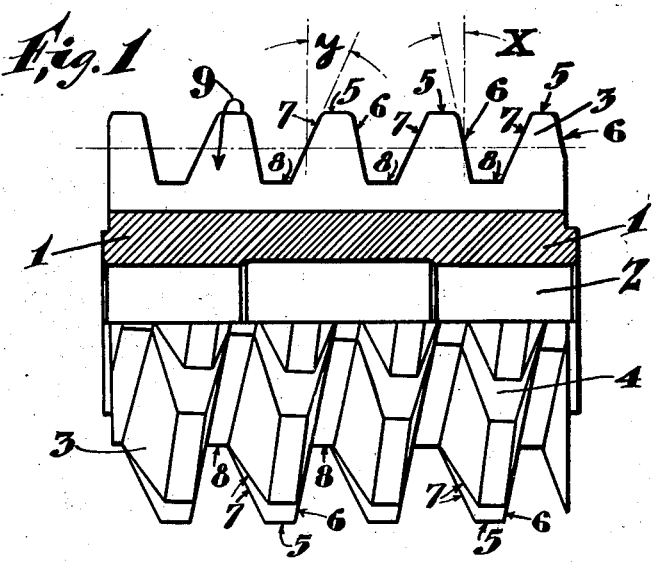
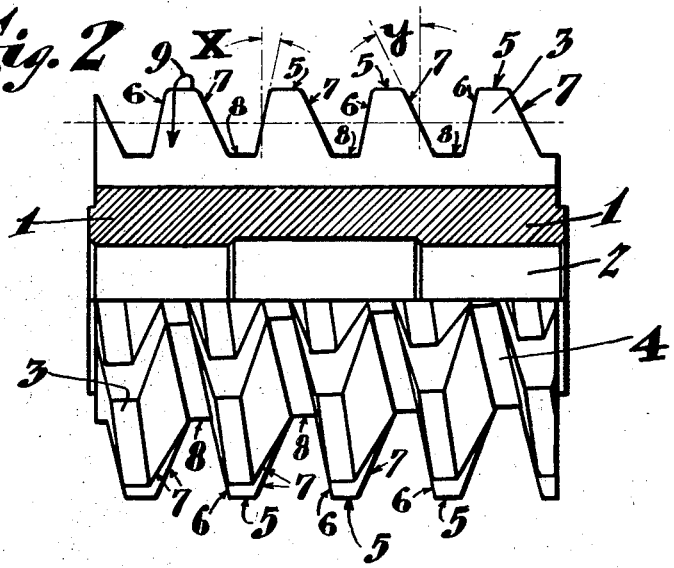
INVENTOR:

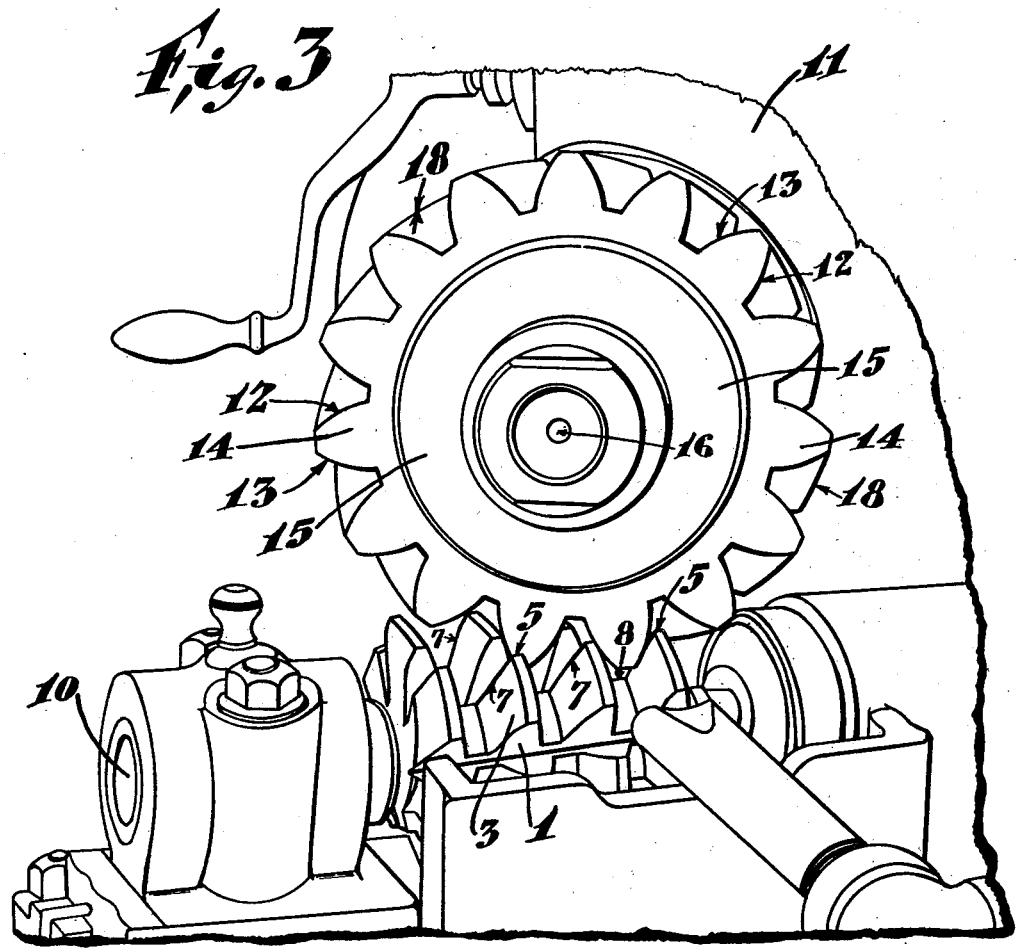

March 15, 1932. O. G. SIMMONS 1,849,810
HOB AND METHOD OF CUTTING FOR TAPERED GEARS
Filed Jan. 30, 1929 5 Sheets-Sheet 3
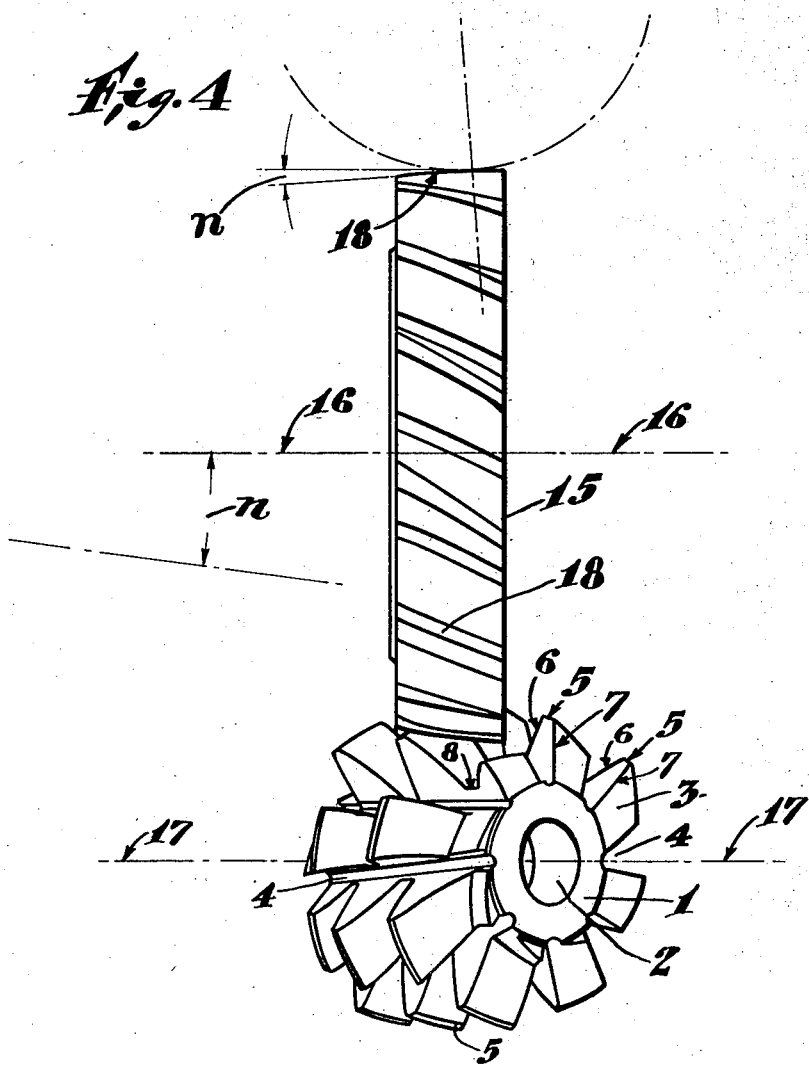
INVENTOR:
Oliver G. Simmons March 15, 1932.  O. G. SIMMONS  1,849,810
HOB AND METHOD OF CUTTING FOR TAPERED GEARS
Filed Jan. 30, 1929  5 Sheets-Sheet 4
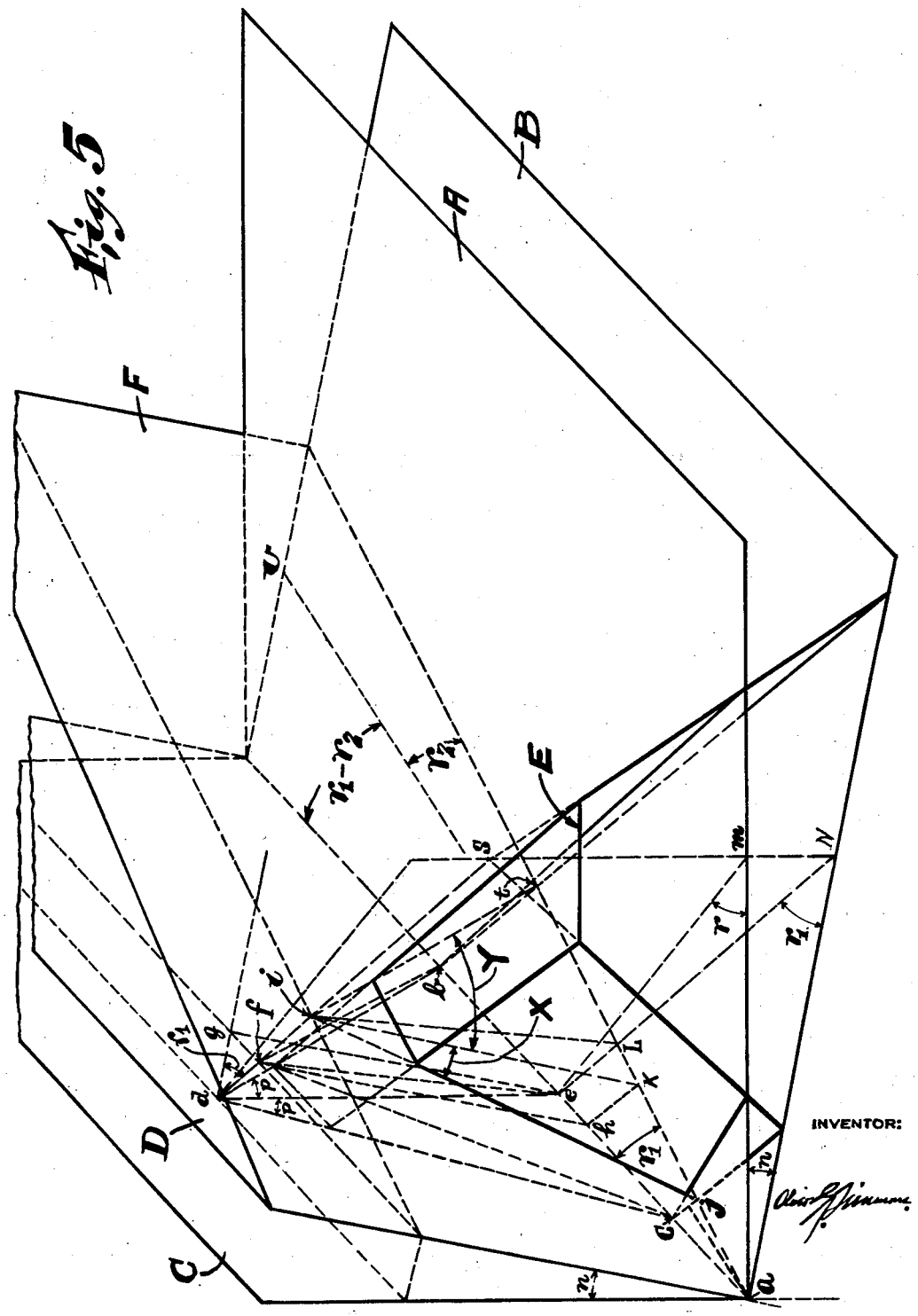

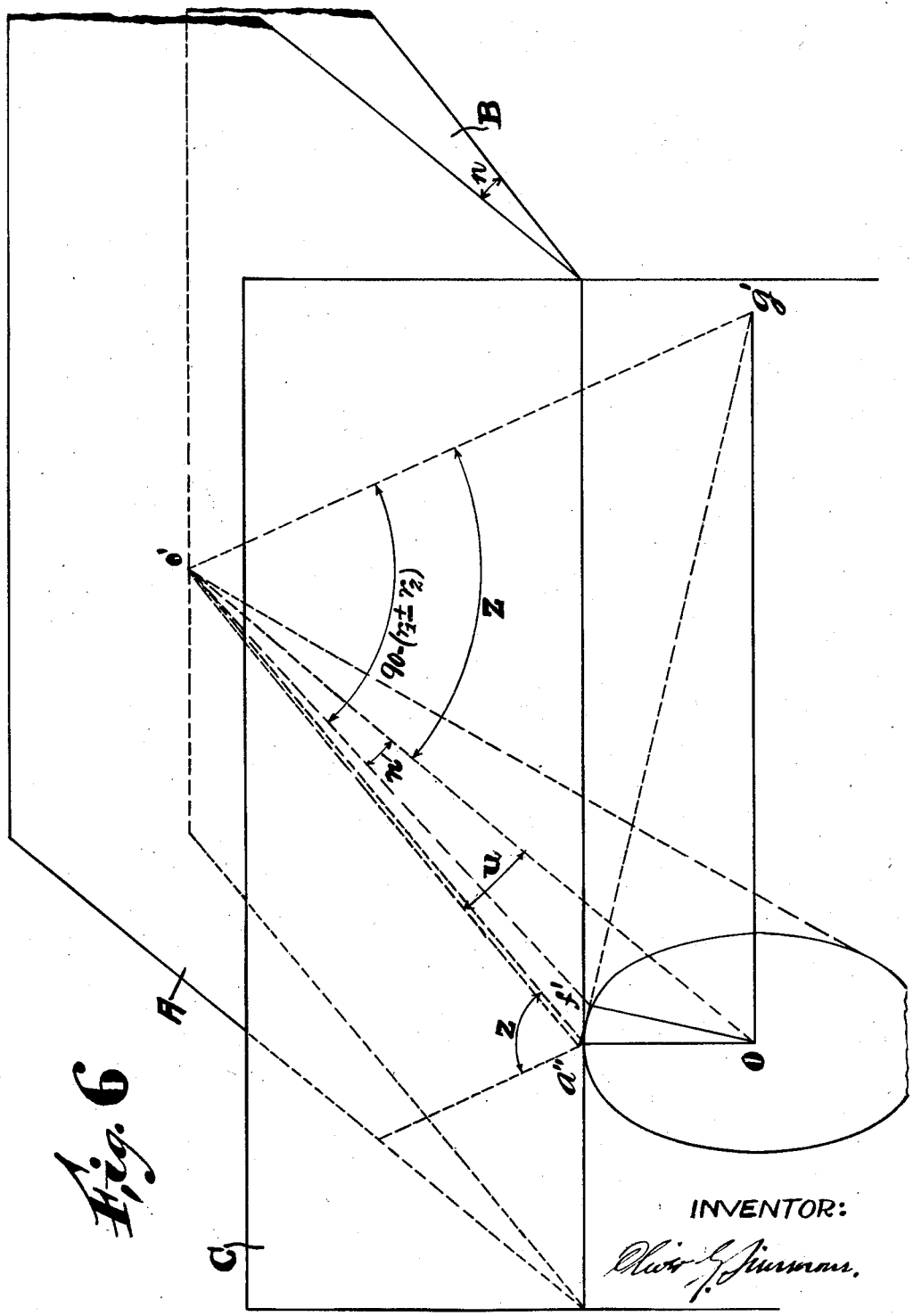

Patented Mar. 15, 1932

1,849,810

UNITED STATES PATENT OFFICE

OLIVER G. SIMMONS, OF LAKEWOOD, OHIO

HOB AND METHOD OF CUTTING FOR TAPERED GEARS

Application filed January 30, 1929. Serial No. 336,088.

My invention relates to a hobbing cutter and method of making same for producing tapered helical cutters, tapered helical gears and the like, upon the principle of the Simmons method, forming the subject matter of my Patent No. 1,588,060, dated June 6, 1926, for method of and apparatus for generating tapered gears on which method and apparatus the present invention may be practiced. The present invention may also be practiced on "tapered gear hobbing machine", patent for which, No. 1,612,042, was issued to E. A. Noll on December 28, 1926.

In generating the teeth of tapered helical cutters and tapered helical gears, by the Simmons method, a hob or hobbing cutter whose teeth are helically disposed is continuously rotated in intermeshing cutting engagement with a rotating blank. Either the cutter, or the blank may have a feed movement in the direction longitudinally of the axis of the blank, and at the same time the axes of the blank and the cutter are slowly brought together to produce the desired tapered teeth on spur and helical gears or spur gear shaper cutters, helical gear shaper cutters, helical worm-shaped cutters and the like.

In tapered helical gears, tapered helical gear shaper cutters and tapered helical worm-shaped cutters, it is desirable that the teeth be provided with involute curves of a given base circle in a plane perpendicular to the axis of the gear or cutters without regard to the cone angle and helix angle in the gear or cutters.

The present invention has for its object to provide a hob which will generate true involute curves on each side of the teeth to a given base circle in a plane perpendicular to the axis in tapered helical gears, cutters, worm-shaped cutters and the like.

An object of the present invention is to provide a hob with angularly disposed cutting teeth with respect to the axis of the hob, adapting said hob teeth to generate involute curves in planes of revolution in tapered helical gears, tapered helical gear shaper cutters, tapered helical worm-shaped cutters and the like.

It is also an object of the present invention to provide a hob with cutting teeth which will generate involute curves in planes of revolution in tapered helical gears, tapered helical gear shaper cutters, tapered helical worm-shaped cutters and the like to a given pressure angle on both sides of the teeth of the articles of manufacture herein referred to when the hob is operated in suitable apparatus in accordance with the Simmons method hereinbefore referred to.

It is a further object of this invention to provide a hob with teeth of a predetermined form, adapting said hob, when operating on the Simmons method, to generate involute curves to a given base circle or evolute on each side of the teeth of tapered helical gears, tapered helical gear shaper cutters, tapered helical worm-shaped cutters and other analogous articles of manufacture provided with tapered helicoidal involute surfaces employed in the arts.

Within the scope of the term analogous articles of manufacture, it is understood that there is included such articles as have tapered threads or tapered teeth capable of being generated on lines of convolution on a conical surface to produce, in a plane of revolution, symmetrical involute teeth and tapered helicoidal involute teeth in substantially the surface of the cone in the general direction substantially longitudinally of the axis of the cone.

Another object of the invention is to provide a hob with teeth elements, such that when said hob is operating on the Simmons method to produce helical teeth, it will generate the teeth of the correct form in a plane perpendicular to the axis in tapered helical tooth cutters, gears and the like.

The invention consists in the means for accomplishing the foregoing objects and other objects of the invention which will later appear, not only in the particular form herein illustrated but in all equivalent constructions and arrangements.

The drawings accompanying this specification, it is understood, are for purposes of illustration. only.

Reference should be had to the accompanying drawings forming a part of this specification in which:

Figure 1 is an elevation view partly in section of a left-handed hob provided with teeth arranged in accordance with the present invention.

Figure 2 is an elevation view partly in section of a righ-handed hob provided with teeth arranged in accordance with the present invention.

Figure 3 is a perspective view in elevation of a portion of a well-known hobbing machine which has been adapted to produce tapered helical gears, tapered helical cutters and the like, showing a hob of the present invention generating the teeth of the tapered helical cutter shown, and in which view the plane perpendicular to the axis of the cutter lies in the plane of the sheet of drawings.

Figure 4 is a left end view of Fig. 3. The plane perpendicular to the axis of the cutter is perpendicular to the sheet of drawings. In this view, only the tapered helical cutter and the hob of the present invention in intermeshing cutting engagement are shown; parts of the machine shown in Fig. 3 being omitted.

Figure 5 is a diagrammatic view illustrating the geometrical method by which the form of the hob tooth is determined.

Figure 6 is a diagrammatic view illustrating the geometrical method by which the proper angular adjustment of the hob for operation in a horizontal position may be determined.

Referring to Fig. 1, one form of a left-handed hob of the present invention is indicated by the numeral 1, which is provided with the bore 2, adapting it to be secured to an arbor in a hobbing machine which has been arranged to operate on the principle of the Simmons method.

The hob is provided with the teeth 3, arranged in a helical path in a longitudinal direction on the periphery of the hob, and is preferably provided with gashes 4 normal to the thread helix, and the teeth 3 relieved in a suitable relieving or backing-off machine to provide the cutting edges 5, 6, 7 and 8, so that as the hob 1 is rotated in the direction of the arrow 9, in intermeshing cutting contact with a blank, the teeth 3 will generate a form of serration or tooth in the blank, dependent upon the form of tooth 3 in the hob and the proper correlation of the movements of the hob with respect to the movements of the blank.

In the commercial art of cutting spur gears and spiral gears the form of the tooth of the hob is made to correspond to the form of the tooth of the rack in accordance with the Sang theory, by the use of a truncated V-shaped generating tool, in which the perpendicular to the base intersects the cone vertex and forms an angle with each side of the V equal to the pressure angle.

Multi-tooth or single tooth tools will generate involute curves to a given base circle in a radial plane, a plane perpendicular to the axis, in either spur gears or helical gears, provided the tool is reciprocated across the face of the blank in a plane parallel to the axial plane of the blank. This theory also underlies the present commercial art of hobbing both spur and spiral gears, and it is the commercial practice generally of cutter manufacturers to make hobs having teeth of truncated V shape in which the sides of the teeth are straight and inclined to the perpendicular to the base, as stated above, at equal angles corresponding to the pressure angle; the hob tooth in the commercial practice referred to being identical with the single tool commercial practice; however, the hob rotates while in cutting contact with the blank and moves across the face of the blank in a plane parallel to the axial plane of the blank, producing involute curved teeth in the radial plane of the blank in spur and spiral gears.

If, however, a single tooth cutting tool or hob having cutting edges normal to the path of movement is caused to move across the face of a gear blank in the direction of the axis of the blank and in a plane disposed at an angle to the axis of the blank, the resultant involute curve on the sides of the teeth of the resultant taper spur gear will be to a base circle slightly larger in diameter than the diameter of the base circle originally computed for straight tooth spur gears in which the hob passes across the face of the blank in a plane parallel to the axial plane of the blank.

To produce the desired involute curves to the desired base circle, it is necessary to increase the angle of the truncated V shape tool used. This in effect is merely increasing the pressure angle. This increased pressure angle is found by dividing the tangent of the pressure angle, as computed for non-tapering gears, by the cosine of the angle of taper, the angle of taper being the angle of the cone surface of the taper gear with the axis thereof, the quotient being the tangent of the angle of the tooth faces of the tool necessary to generate gear teeth of the desired pressure angle.

In generating tapered helical gears and the like, there is also a discrepancy between the angle of the cutting teeth and the pressure angle of the gear tooth faces, but the discrepancy is different in that the tooth curves of the tapered helical gear, in a plane perpendicular to the axis, are not the required involute curve on either side of the teeth and moreover, the curves are not alike. The actual curves generated on each side of the teeth are the involutes of different base circles, one being smaller and the other larger than the desired base circle, producing, in effect, a leaning tooth of decided proportions enabling it to be noted by visual inspection, and resulting in what is known as a lopsided, or, as we say in the shop, a "drunken tooth". This is not appreciably manifested when the helix angle and the cone angle are very small, but as the cone angle and helix angle are increased, the error increases entirely beyond tolerance limits, for instance, when a helix angle of approximately 30° and a cone angle of approximately 6° are used, the resultant tooth is very much lopsided, the teeth of a right-handed tapered helical gear or cutter produced as aforesaid leaning in one direction, and the teeth of a left-handed cutter leaning in the opposite direction.

If, therefore, the teeth in the tapered helical gear or cutter, or the like, are to be generated with the same pressure angle on both sides, it has been found, as hereinbefore referred to, that the hob teeth must have an increased pressure angle on one side and a decreased pressure angle on the other side. The method of determining the proper unsymmetrical pressure angles required in the hob is one of the objects of the present invention as herein disclosed.

To overcome the difficulty above referred to, it is necessary to provide the teeth 3 of the hob 1, see Fig. 1, with side cutting edges 6 and 7 of the correct inclination, the correction being made to take care of the error due to the taper and also the error due to the angularity of the helical teeth. In the case of the straight-sided form of tooth 3, the edge 6 of the hob 1 will be provided with the pressure angle $y$, and the side of cutting edge 7 will be provided with the angle $x$. The teeth of the hob 1, therefore, are lopsided and lean substantially as shown. A right-handed hob will be used to produce right-handed tapered helical cutters, gears and the like. In a similar way, hob 1, of Fig. 2, having teeth leaning in the direction opposite to that of the hob 1, of Fig. 1, and being left-handed, will be used to produce left-handed tapered helical gears, left-handed tapered helical cutters and the like. The left-handed hob of Fig. 1 has teeth leaning toward the right of the person viewing the drawings, whereas the right-handed hob of Fig. 2 has teeth leaning toward the left of the person viewing the drawings.

The left-handed hob of Fig. 1, provided with teeth as described, and leaning in the direction referred to, should be used to generate the teeth in left-handed tapered helical cutters, left-handed tapered helical gears, left-handed tapered helical worm-shaped cutters and the like, and the right-handed hob of Fig. 2 should be used to generate the teeth in right-handed tapered helical cutters, right-handed tapered helical gears, right-handed tapered helical worm-shaped cutters and the like.

In connection with the commercial use of the hob shown in Figs. 1 and 2, it is important that they be arranged and used as described, and it is also important that the hobs rotate in the proper direction. In Figs. 1 and 2, the correct direction of rotation of the hobs is toward the person viewing the drawings; that is to say, the direction of rotation must be in the direction of the arrow 9, respectively, in Figs. 1 and 2.

With further reference to Figs. 1 and 2 wherein a multi-tooth rack cutter, in the form of a hob, is shown, it will be obvious to those skilled in the art that a truncated V shaped cutting tool having the form of one of these teeth could be used to produce tapered helical cutters, tapered helical gears, tapered helical worm-shaped cutters and the like, the cutting tool corresponding to a tooth of the imaginary rack of the gear as is well understood in the art.

As will be understood by those skilled in this art, it is important that the axis of the hob 1 be set at the proper angle with respect to the axis of the blank. This is illustrated in Fig. 3 in which the right-handed hob 1, of Fig. 2, is fixedly secured to the arbor 10 of a well-known hobbing machine 11, which has been adapted to operate on the principle of the Simmons method previously referred to. In this view, the hob 1 is shown as having finished generating the involute curves 12 and 13 of the teeth 14 of the right-handed helical gear shaper cutter 15 shown, (a Sykes helical cutter for use on the Sykes generator). The involute curves 12 and 13 are involutes of the same base circle.

In accordance with the principle of the Simmons method, previously referred to, the axis 16 of the cutter, see Fig. 4, will approach the axis 17 of the hob in the pass of the hob across the conical face 18 of the helical cutter 15, the angle of the conical face 18 with respect to the axis 16, of the helical cutter 15, being indicated by the letter $n$.

The movement of the hob across the face, as described, is equivalent in effecting the desired result, to a movement of hob 1 in a plane tangent to the conical surface 18.

Referring to Fig. 5 of the drawings, the plane A is a horizontal plane parallel with the axis of the gear blank; the plane B is a plane tangent to the cone of the gear blank and parallel to the plane in which the axis of the hob moves in generating the gear; the plane C is the plane perpendicular to the axis of the blank in which the line of intersection of the planes A and B lies; D is a plane perpendicular to the plane B and intersecting planes A and B along their line of intersection; E represents a tooth of the rack of the tapered gear; and F is a plane perpendicular to plane B and normal to the rack tooth E.

The planes A, B, C and D intersect along the line $ab$. The faces of the rack tooth E intersects the plane C on the lines $cd$ and $bd$. The line $de$ is perpendicular to the line $ab$. The angles $bde$ and $cde$ are equal to each other and to the pressure angles of the involute faces of the teeth of the tapered gear. The angle $maN$ is the angle of taper of the gear. The line $ds$ is the line of intersection of the opposite faces of the rack tooth E and the plane $edsm$ is the plane of line $ds$ perpendicular to the plane A.

The angle $ame$ is the angle of the apex of the rack tooth with respect to the axis of the gear. The angle $aNe$ is the angle of the rack tooth with respect to the line of tangency $aN$ of the plane B with the cone of the gear.

Lines $cf$ and $bf$ are the lines of intersection of the planes of the rack tooth faces with the plane D.

Lines $ji$ and $ti$ are the lines of intersection of the planes of the rack tooth faces with the plane F.

Lines $fh$, $ge$ and $ik$ are perpendiculars to the plane B and are equal, points $f$, $g$ and $i$ lying in a plane parallel with plane B, $ge$ being the intersection with the plane D of a plane perpendicular to plane C and intersecting same on line $de$.

The angles $kij$ and $kit$ are the normal pressure angles of the rack tooth.

Let $p$ designate the angle $edc$ or $edb$ which is equal to the pressure angle of the gear to be generated by the hob.

Let $n$ designate the angle $maN$ which is the angle of taper of the gear.

Let $r$ designate the angle $ame$ which is equal to the helix angle of the gear measured in the plane A parallel to the axis of the gear.

Let $r_1$ designate the angle $aNe$ which is the angle of the rack tooth measured in the tangent plane B.

Let $x$ and $y$ designate the angles $jik$ and $kit$ which are the normal pressure angles of the rack teeth which correspond to the angles of the hob teeth measured in the normal planes of the cutting edges.

The values of $p, n, r$ being known, the values of $r_1, x$ and $y$ may be computed as follows:

(1) $\dfrac{ae}{am} = \tan r$ (2) $\dfrac{ae}{aN} = \tan r_1$ (3) $\dfrac{\tan r_1}{\tan r} = \dfrac{am}{aN} = \cos n$ (4) $\tan r_1 = \tan r \cos n$ (1) $\tan cfh = \dfrac{ch}{fh}$ (2) $\tan bfh = \dfrac{bh}{fh}$ (3) Angle $fgd = r_1$, $dg$ and $df$ being parallel to lines $aN$ and $eN$ and parallel to the plane B.

(4) Angle $deg = n$, being the measure of the angle between planes C and D in a plane normal to the line of intersection between the planes.

(5) Angles $dge$ and $dgf$ are right angles, line $dg$ being perpendicular to the plane D and lines $bg$ and $eg$ lying in plane D.

(6) $fg = he$, lines $ge$ and $fh$ being perpendicular to plane B and parallel.

(7) $fg = dg \tan r_1$   (3)
(8) $dg = de \sin n$   (4)
(9) $fg = de \tan r_1 \sin n$   (7)   (8)
(10) $he = de \tan r_1 \sin n$   (6)
(11) $ce = be = de \tan p$

(12) $\tan cfh = \dfrac{de \tan p - de \tan r_1 \sin n}{fh}$   (11)   (10)

(13) $\tan bfh = \dfrac{de \tan p + de \sin r_1 \sin n}{fh}$

(14) $fh = eg = de \cos n$

(15) $\tan cfh = \dfrac{\tan p - \tan r_1 \sin n}{\cos n}$

(16) $\tan bfh = \dfrac{\tan p + \tan r_1 \sin n}{\cos n}$

(17) $\tan x = \dfrac{jk}{ik}$

(18) $\tan y = \dfrac{tk}{ik}$

(19) $ik = hf$, being perpendiculars to plane B from line $ds$ parallel with plane B.

(20) $jk = ch \cos r_1$ plane F being normal to $eN$ and perpendicular to plane B and line $eN$ being perpendicular to line $a1$, angle $ea1$ is equal to $r_1$; also line $ds$ being parallel to line $eN$, lines $hk$ and $cj$ are parallel to line $ds$ and therefore to line $eN$.

(21) $\tan x = \dfrac{ch \cos r_1}{hf}$   (18)   (19)   (20)

(22) $\tan x = \tan cfh \cos r_1$
(23) $kt = bh \cos r_1$
(24) $\tan y = \tan bfh \cos r_1$

(25) $\tan x = \dfrac{(\tan p - \tan r_1 \sin n) \cos r_1}{\cos n}$   (15)

(26) $\tan y = \dfrac{(\tan p + \tan r_1 \sin n) \cos r_1}{\cos n}$   (16)

If a hob involute tooth form be used instead of a hob having teeth straight in planes normal to the teeth, the correct pressure angles for the opposite hob tooth faces are the angles of the rack tooth faces to the plane $h\ f\ i\ k$ measured in a plane at right angles to the axis of the hob, the position of which is indicated by the line $a\ v$ at an angle to the rack tooth equal to the complement of the helix angle of the hob.

Let $r_2$ be the helix angle of the hob, i. e., the angle of the hob thread to a plane perpendicular to the hob axis, and $x^1$ and $y^1$ be the pressure angles of the opposite involute faces of the hob teeth.

Since $x$ and $y$ are the angles of the faces of the rack tooth E measured in the normal plane F:

$$\tan x^1 = \frac{\tan x}{\cos(90° - r_2)} = \frac{\tan x}{\sin r_2}$$

$$\tan y^1 = \frac{\tan y}{\sin r_2}$$

As is well understood in the art, the axis of the hob is set at an angle to the rack tooth equal to the complement of the helix angle of the hob. In Fig. 5 the line $a\ v$ indicates the position of the hob axis, the angle between the axis of the hob and the tangent line $a\ N$ in plane B, angle $v\ a\ N$ is equal to $90° - (r_1 \pm r_2)$. The axis of the hob lies in a plane parallel with the plane B and, to bring the hob axis to the position indicated in Fig. 5, it would be necessary to adjust the hob angularly about both a horizontal and a vertical axis.

During the cutting operation, the feed of the hob along and toward the axis of the work is along the line of taper the same as the feed of the cutter in the Simmons patent or the Noll patent above referred to and may be accomplished by a feed mechanism such as shown in either of these patents.

If the plane B in Fig. 5 were rotated bodily about the axis of the work, it is apparent that the line $a\ v$ could be brought to a horizontal position. The hob spindle and work spindle may thus be both positioned in horizontal planes and by properly adjusting the hob about a vertical axis and feeding the same during the cutting operation longitudinally of the axis of the blank and inwardly toward the same at the proper angle, the adjustment of the hob spindle or work spindle about a horizontal axis may be dispensed with.

Fig. 6 of the drawings illustrate the geometry by which the proper angular adjustment of the hob in a plane parallel to the axis of the gear may be determined.

In Fig. 6, the planes A, B and C are the same as in Fig. 5. In this figure, the points $o$, $o'$ and $g'$ lie in an axial plane of the cone parallel to the plane A.

The points $f'$, $o'$ and $g'$ lie in a plane tangent to the cone along line $f'\ o'$.

The angle $f', o', g'$ is equal to $90° - (r_1 \pm r_2)$. The horizontal line $o'\ g'$ is therefore parallel to the axis of a hob properly positioned with respect to the cone and lying in a horizontal plane.

The angle $o\ o'\ g'$ is the measure of the angular adjustment of the hob in a horizontal plane.

Let $z$ designate the angle $o\ o'\ g'$.

The angle of feed of the hob is the angle between the planes $f'\ o'\ g'$ and $o\ o'\ g'$ measured in a vertical axial plane, i. e., the angle $a''\ o'\ o$.

Let $u$ designate the angle of feed.

The angles $z$ and $u$ can be computed as follows:

(1) $\cos z = \dfrac{o\ o'}{o'g'}$ (2) $o\ o' = o'\ f' \cos n$
(3) $o'\ f' = o'\ g' \cos[90° - (r_1 \pm r_2)]$
(4) $o\ o' = o'\ g' \cos n \cos[90° - (r_1 \pm r_2)]$
(5) $\cos z = \cos n \cos[90° - (r_1 \pm r_2)]$
(6) $\cos z = \cos n \sin(r_1 \pm r_2)$ (1) $\tan u = \dfrac{o\ a''}{o\ o'}$ (2) $o\ a'' = o\ f' \sec f'\ o\ a''$
(3) $o\ f' = o\ o' \tan n$
(4) $o\ a'' = o\ o' \tan n \sec f'\ o\ a''$   (2)   (3)
(5) $\tan u = \tan n \sec f'\ o\ a''$   (1)   (4)

(6) $\sec f'\ o\ a'' = \dfrac{o'g'}{f'g'}$ angle $f'\ o\ a''$ being equal to angle $f'\ g'\ o$.

(7) $o\ g' = o'\ g' \sin z$
(8) $f'\ g' = o'\ g' \sin[90° - (r_1 \pm r_2)]$ (9) $\sec f'\ o\ a'' = \dfrac{\sin z}{\sin[90° - (r_1 \pm r_2)]}$ (6) (7) (8)

(10) $\tan u = \dfrac{\tan n \sin z}{\sin[90° - (r_1 \pm r_2)]}$   (5)   (9)

(11) $\tan u = \dfrac{\tan n \sin z}{\cos(r_1 \pm r_2)}$

The hob formed as above described may be adjusted horizontally about a vertical axis to the angle $z$ with respect to the vertical plane of the axis of the work spindle and fed longitudinally of the blank at the angle $u$ while it is held in horizontal position and will generate a tapered gear which will mesh with the rack tooth E and which will have involute tooth faces whose pressure angles are all equal to the angle $p$.

It should be noted that the rack of the tapered gear has such a form that the lines of intersection of the planes of the opposite faces of a rack tooth with any plane perpendicular to the axis of the gear are at equal angles with respect to a radial line in the perpendicular plane through the point of intersection. The intersection of planes perpendicular to the axis of the gear with the tooth faces of the tapered gear will, therefore, be involutes to a single base cylinder and the involute curve will be the same on opposite sides of the teeth.

What I claim is:

1. The herein described method of generating tapered gears, gear shaped cutters and the like which comprises positioning a hob having helically disposed cutting teeth with its axis crossing the axis of the gear blank at an angle such that the contacting portions of the teeth of the hob and blank are substantially parallel and with its axis parallel to a plane between said axes which is tangent to the cone of the gear blank, the teeth of the hob having side faces at unequal inclinations corresponding to the unequal inclinations of the faces of the teeth of the imaginary rack of the gear blank moving in said tangent plane measured in the plane of the hob axis normal to said tangent plane, rotating said hob and gear blank at a fixed speed ratio and feeding said hob longitudinally of the blank in a direction parallel to said tangent plane.

2. The herein described method of generating tapered gears, gear shaped cutters and the like which comprises positioning a hob having helically disposed cutting teeth with its axis crossing the axis of the gear blank at an angle such that the contacting portions of the teeth of the hob and blank are substantially parallel and with its axis parallel to a plane between said axes which is tangent to the cone of the gear blank, the teeth of the hob having side faces at unequal inclinations corresponding to the unequal inclinations of the faces of the teeth of the imaginary rack of the gear blank moving in said tangent plane measured in the plane of the hob axis normal to said tangent plane rotating said hob and gear blank at a fixed speed ratio, and feeding said hob without change of angular position longitudinally of the axis of the blank in a direction parallel to said tangent plane.

3. The herein described method of generating tapered helical gears, gear shaped cutters and the like, which comprises positioning a hob having helically disposed cutting teeth with its axis parallel to a plane intermediate the axis of the hob and the axis of the blank and tangent to the cone of the gear blank and with its axis crossing the axis of the blank and at an angle to the axis of the blank equal to the algebraic sum of the helix angles of the hob and blank measured in a plane parallel to the axis of the gear blank, the teeth of the hob having side faces at unequal inclinations corresponding to the unequal inclinations of the faces of the teeth of the imaginary rack of the gear blank moving in said tangent plane measured in the plane of the hob axis normal to said tangent plane rotating the hob and gear blank at a fixed speed ratio, and feeding the hob longitudinally of the blank without change in the relative angular positions of said axes and in a direction parallel to said tangent plane.

4. The herein described method of making tapered gears, gear shaped cutters and the like whose teeth have a constant pressure angle on opposite sides and throughout their length which comprises cutting said gear with a hob disposed with its axis parallel to a plane intermediate the axes of the hob and blank and tangent to the cone of the blank and having teeth formed with side cutting faces at unequal inclinations to mesh with the teeth of the imaginary rack of the gear moving in said plane tangent to the cone of the gear, rotating the gear and blank at a fixed speed ratio, and feeding the hob longitudinally of the blank without change in the relative angular positions of the axes and in a direction at an angle to the axis of the blank parallel to said tangent plane.

5. The herein described method of making tapered helical gears, gear shaped cutters and the like which comprises cutting said gear with a hob positioned with its axis in a plane parallel to a plane intermediate its axis and the axis of the gear blank which is tangent to the cone of the gear blank, and having helically disposed teeth formed with side cutting faces at unequal inclinations to mesh with the imaginary rack of the gear moving in said tangent plane, rotating said gear blank and hob at a predetermined speed ratio and advancing said hob longitudinally of the axis of the blank while its axis is maintained parallel to said tangent plane.

6. The herein described method of generating tapered helical gears, gear shaped cutters and the like, which comprises cutting the gear with a hob having helically disposed cutting teeth which mesh with a straight tooth rack whose tooth faces are inclined oppositely and at unequal angles to the axis of the hob, with the hob so positioned with respect to the gear being cut that the faces of the rack teeth intersect planes at right angles to the axis of the gear along lines which are equally and oppositely inclined to a radius of the gear through their point of intersection.

7. The herein described method of making tapered helical gears, gear shaped cutters and the like which comprises cutting said gear with a hob having helically disposed teeth formed with side cutting faces at unequal inclinations to mesh with the imaginary rack of the tapered gear moving in a plane tangent to the cone of the gear, adjusting said hob about an axis extending at right angles to its axis and at right angles to the axis of the gear blank, rotating the hob and gear blank at a predetermined speed ratio and feeding the hob without change in its angular position along the axis of the blank in a plane tangent to the cone of the gear to be generated.

8. A hob provided with cutting teeth, each having cutting edges at its opposite sides which have unsymmetrical pressure angles formed to mesh with an imaginary rack which is symmetrical in a predetermined plane inclined with respect to the hob axis, whereby the hob is adapted to generate cut teeth with symmetrical pressure angles in a blank disposed with its axis normal to said plane.

9. The herein described method of generating a tapered helical gear, tapered helical cutter, a blank and analogous articles of manufacture by rotating a blank and a hob with helically disposed teeth in predetermined timed relation and simultaneously feeding the hob at a uniform rate without change in angular position in a direction oblique to the blank axis, at an angle to produce the required degree of taper with the hob so positioned and so formed with unsymmetrical pressure angles on the two sides of the hob teeth to produce generated teeth in the blank of the desired pressure angle, measured in planes of rotation perpendicular to the blank axis.

In testimony whereof I affix my signature.

OLIVER G. SIMMONS.